(No Model.) 2 Sheets—Sheet 1.
H. N. H. LUGRIN.
FLEXIBLE SHUTTER.
No. 498,477. Patented May 30, 1893.
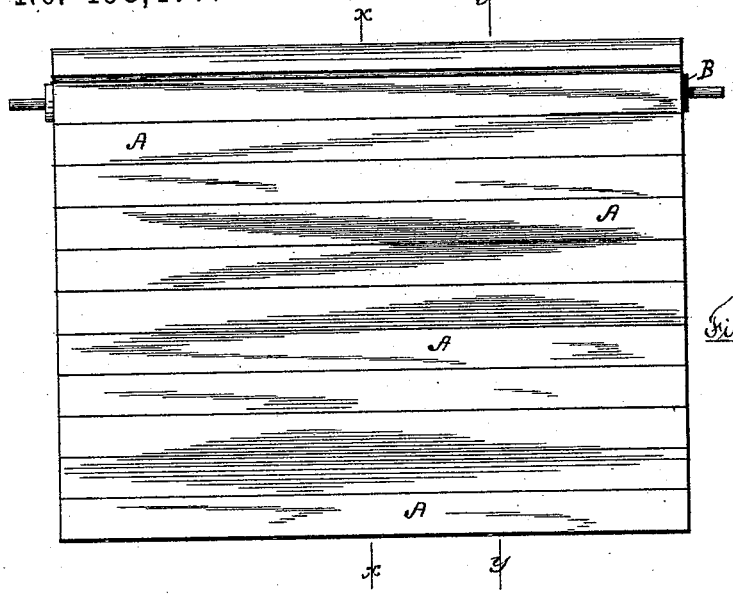
Fig. 1.
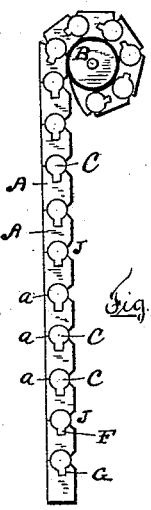
Fig. 2.
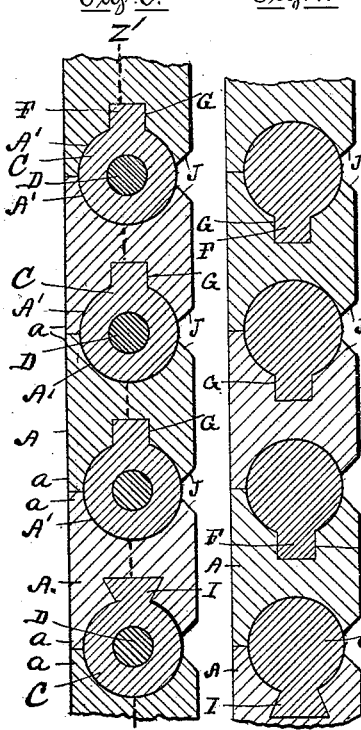
Fig. 3. Fig. 4.
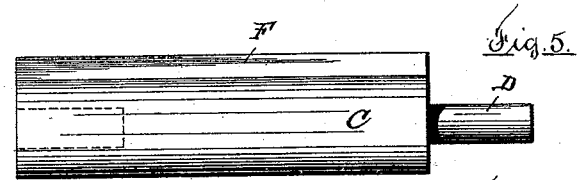
Fig. 5.
Fig. 6.
Fig. 7.
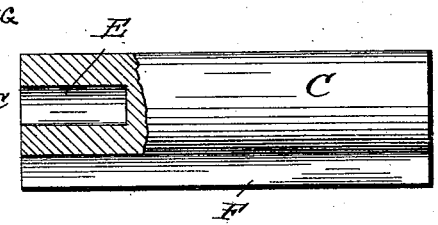
Fig. 8.
Witnesses
Walter S Bowen
John E. Wakefield
Inventor
Horatio N. H. Lugrin
By his Attorney
Rufus B. Fowler

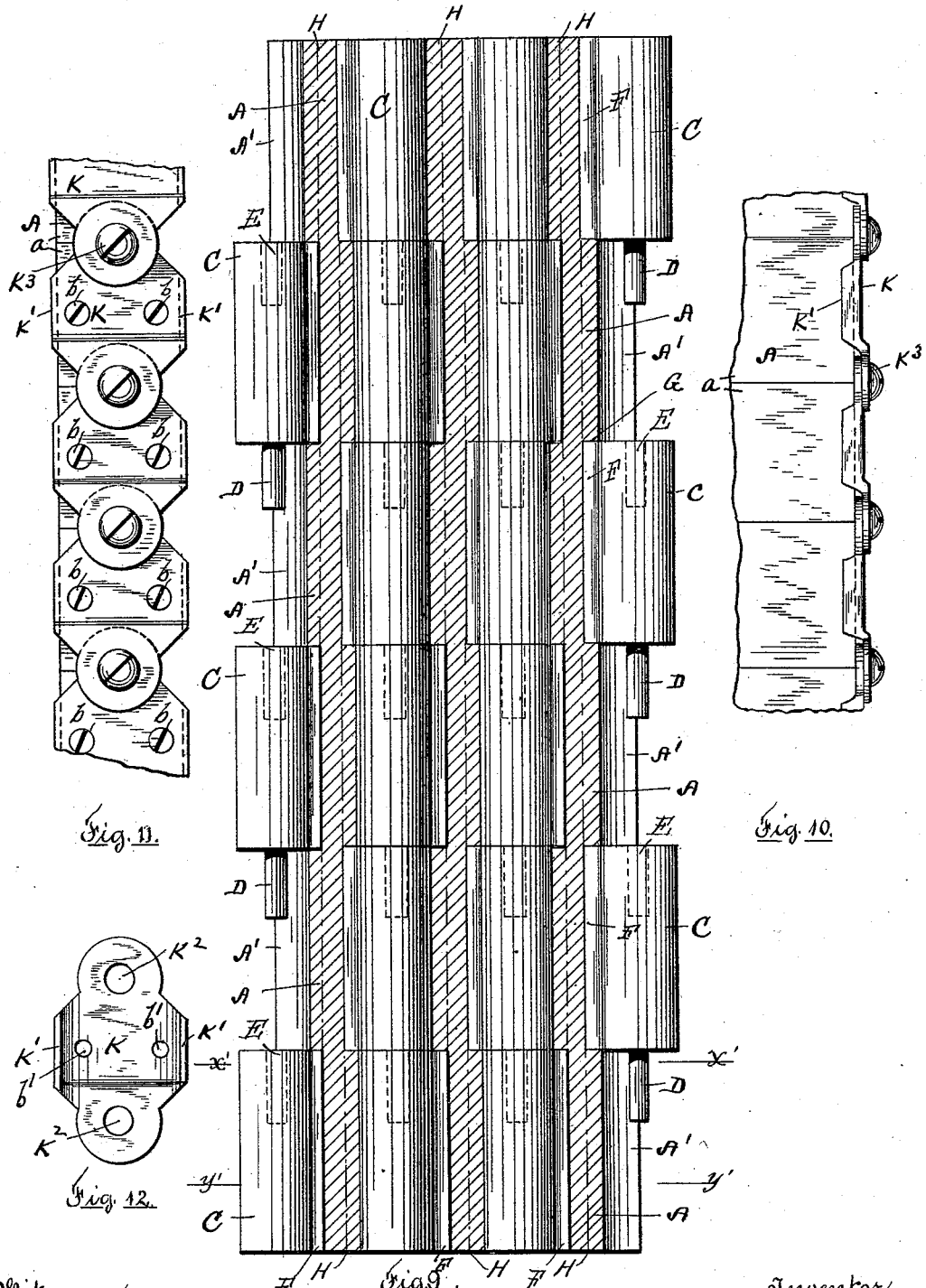

UNITED STATES PATENT OFFICE.

HORATIO N. H. LUGRIN, OF WORCESTER, MASSACHUSETTS, ASSIGNOR, BY DIRECT AND MESNE ASSIGNMENTS, TO THE LUGRIN FLEXIBLE DOOR COMPANY, OF PORTLAND, MAINE.

FLEXIBLE SHUTTER.

SPECIFICATION forming part of Letters Patent No. 498,477, dated May 30, 1893.

Application filed April 18, 1890. Serial No. 348,488. (No model.)

*To all whom it may concern:*

Be it known that I, HORATIO N. H. LUGRIN, a citizen of the United States, and a resident of Worcester, in the county of Worcester and State of Massachusetts, have invented a new and useful Improvement in Flexible Shutters, described in the following specification and illustrated in the accompanying drawings, which form a part of this specification, and in which—

Figure 1 represents a front view of a rolling or flexible shutter embodying my invention and as attached to a roll. Fig. 2 is an end view of the same. Fig. 3 represents a portion of the shutter in enlarged view, and shown in section on line X, X, Fig. 1, and illustrated by the line X', X', Fig. 9. Fig. 4 is a similar view, shown in section on lines Y, Y, Fig. 1, and Y', Y', Fig. 9. Figs. 5, 6, 7 and 8, represent detached views of the cylindrical pieces forming the barrels and pintles, Fig. 8 being shown in sectional view in order to disclose the chamber, which receives the pintle. Fig. 9 shows in full size, a portion of the shutter, the bars, or leaves being shown in sectional view on line Z' Z' Fig. 3, with the cylindrical pieces shown in full. Fig. 10 is a front view of the ends of a portion of the bars, or leaves composing the shutter, with the metal links attached thereto. Fig. 11 is an end view of a portion of the shutter, showing the metal links, and Fig. 12 is a detached view of one of the metal links.

Similar letters refer to similar parts in the different figures.

My invention relates to a rolling or flexible shutter, which is intended to be made preferably of wood, and is adapted for use in roll-top desks, as a shutter for doors and windows, and as a temporary partition in rooms, offices, and for similar purposes.

Referring to the accompanying drawings, A, A, denote a series of parallel bars, or leaves of which the body of the shutter is composed.

B represents a roll upon which for the purposes of illustration, the shutter shown in the drawings is represented as partially wound, the edges *a, a,* of the leaves A are brought into contact when the shutter is extended forming a continuous plain surface, which can be rendered more ornate if desired by beading or moldings, in any of the well known forms of surface ornamentation. The leaves A extend entirely across the surface of the shutter from side to side, and their edges are provided with the concave or semi-circular grooves A', A', to receive the cylindrical pieces C, C, the pieces at one side having at one end a concentric pin D projecting from the end and preferably formed in one piece or integral with the cylindrical piece C, and the cylindrical pieces C at the opposite side of the shutter being provided with an interior concentric chamber E, to receive the concentric pin of the next adjacent cylindrical piece C, while the cylindrical pieces in the shutter other than those upon the edges or sides, are provided with a concentric chamber at one end and a projecting pin at the opposite end, as represented in Fig. 9 of the drawings. Each of the pieces C, is provided with a tongue F, which enters a corresponding mortise G in one of the leaves A, the cylindrical pieces being attached alternately to the leaves upon opposite sides, so that the piece attached to the leaf upon one side will be hinged to the cylindrical piece attached to the opposite leaf.

Referring to Fig. 9 the upper horizontal row of cylindrical pieces is shown as attached to the leaves upon their left, the second row of cylindrical pieces to the leaves upon their right, and so on the series of cylindrical pieces between any two adjacent leaves A being alternately attached to the leaves upon the opposite sides, thereby hinging each pair of leaves together.

In lieu of the mortises G in the leaves A to receive the tongues F said mortises extending only the length of the tongues, as shown, the leaves can be grooved throughout their entire length and the tongues F inserted in the grooves and secured by gluing or otherwise. In some cases when the leaves are grooved their entire length as indicated by the broken lines H, Fig. 9 the grooves and tongues are constructed as represented at I, Fig. 3, dovetailing the leaves A and cylindrical pieces C together.

The edges of the leaves A are cut away at

J, in order to allow the shutter to bend in one direction as it is rolled up, or when necessary to render the shutter flexible in both directions the edges are cut away on both sides of the shutter. The ends of the leaves A and cylindrical pieces upon the sides of the shutter are covered by a series of metallic links K, attached by screws $b$ $b$ to the leaves A and with their edges at $K'$ turned at an angle to overlap the side of the leaves and provided with the holes $K^2$ through which I pass a pin or screw $K^3$, entering the center of the cylindrical pieces C, and forming pintles upon which the metallic links are hinged. The links K are placed upon both sides of the shutter and receive a portion of the tensile strain upon the shutter in the operation of winding and unwinding the shutter. The flanges $K'$ serve to inclose the sides of the leaves and prevent the splitting or checking of the ends and as the shutter is wound upon the roll B, the projecting flanges $K'$ are brought in contact with each other, thereby holding the surfaces of the leaves A apart and preventing the abrasion of their surfaces.

What I claim as my invention, and desire to secure by Letters Patent, is—

1. In a flexible shutter the combination of the series of parallel bars, or leaves, provided with concave edges, a series of strips fitting said concave edges of the bars, or leaves, said strips being provided with projecting pins and chambers alternately, by which said strips are hinged together, and said strips being alternately attached to the adjacent edges of each pair of leaves, substantially as described.

2. In a flexible shutter, the combination of a series of parallel bars, forming leaves, and provided at their edges with mortises or grooves, a series of cylindrical strips having tongues adapted to enter said mortises or grooves and projecting pins concentric with and projecting from, the alternate cylindrical strips and entering corresponding chambers in the opposing strips, substantially as described.

3. In a flexible shutter, the combination of the leaves A, cylindrical strips C, tongues F, projecting pins D, grooves or mortises in said leaves to receive said tongues, and concentric chambers E to receive said pins, whereby said leaves are hinged together, substantially as described.

Dated the 15th day April, 1890.

HORATIO N. H. LUGRIN.

Witnesses:
FREDERICK E. POLLARD,
RUFUS B. FOWLER.